United States Patent Office 2,852,565
Patented Sept. 16, 1958

2,852,565

METHOD FOR CONDUCTING FREE ATOM AND FREE RADICAL CHAIN REACTIONS

Kenzie Nozaki, El Cerrito, Calif., assignor to Shell Development Company, New York, N. Y., a corporation of Delaware No Drawing. Application November 27, 1953
Serial No. 394,905

15 Claims. (Cl. 260—609)

This invention relates to a method for conducting chemical reactions. More particularly, the invention relates to a process for conducting chemical reactions which proceed via a free atom and/or free radical chain reaction mechanism.

Specifically, the invention provides an economical and highly efficient process for conducting free atom and/or free radical chain reactions, which comprises adding a relatively high molecular weight linear polymer, such as polyisobutylene, to a liquid medium containing the reactants taking part in the said free atom and/or free radical chain reaction and then applying shear stress to the resulting liquid mixture, such as, for example, by shaking, so as to effect a degradation of the linear polymer.

As used throughout the specification and claims the expression "free atom" refers to free monovalent atoms, such as hydrogen and chlorine, which are electrically neutral, possess an unpaired electron and exhibit an unsaturated behavior. The expression "free radical" as used throughout the specification and claims refers to free complexes made up of at least two different elements, such as methyl and ethyl, which are electrically neutral, possess an unpaired electron and exhibit an unsaturated behavior.

This application is a continuation-in-part application of application Serial No. 105,654, filed July 19, 1949, now abandoned.

It is now recognized that many chemical reactions proceed via a free atom and/or free radical chain reaction mechanism. According to this mechanism, one of the reactants present in the reaction mixture is converted into a free atom or free radical, and these elements then react upon collision with the molecules of the other reactant. The chemical change that results from this collision gives rise to additional free atoms or radicals and these in turn may react with other molecules to eventually produce the original free atoms or free radicals which started this series of reaction. These original free atoms or free radicals then initiate another series of reactions and the process continues in this manner until the free atoms or free radicals are eventually lost through combination with other free atoms or radicals, absorption by the walls of the reaction chamber, etc. As this type of reaction is self-perpetuating it is referred to as a "chain" reaction.

The free radical chain reaction mechanism described above may be illustrated by the following equations suggested for the reaction between carbon tetrabromide and styrene to form 1,1,1,3-tetrabromo-3-phenylpropane. In the equations the unpaired electron in the free radical is represented by a dot.

(1)   $.R + CBr_4 \rightarrow RB + .CBr_3$
(2)   $.CBr_3 + CH_2=CHC_6H_5 \rightarrow CBr_3CH_2-CHC_6H_5$
(3)   $CBr_3CH_2-CHC_6H_5 + CBr_4 \rightarrow$
            $CBr_3CH_2-CBrHC_6H] + .CBr_3$ In the first step, i. e., the initiation step, the carbon tribromide free radical is formed by contact with another free radical. In the second step, the carbon tribromide free radical reacts with the styrene to form a second free radical, and this latter free radical reacts with the carbon tetrabromide to form the carbon tribromide free radical. This series of reactions is repeated until the free radicals are destroyed as described hereinabove.

Various means for initiating the free atom and/or free radical chain reactions have been suggested in the art. Such methods include exposing the reactants to light, high temperatures, and use of peroxide catalysts. These methods, however, are not entirely satisfactory. The use of peroxides is objectionable, for example, as the reaction is difficult to control and often requires the use of high temperatures. The use of light is objectionable as it usually fails to produce a homogeneous initiation of the free atoms and free radicals, and in many cases requires the use of special solvents for the reaction.

It is an object of the invention, therefore, to provide a method for conducting free atom and/or free radical chain reactions. It is a further object to provide a method for conducting free atom and/or free radical chain reactions that can be accomplished without the use of peroxides, light and relatively high temperatures. It is a further object to provide a method for conducting free atom and/or free radical chain reactions that can be accomplished in an economical and highly efficient manner. It is a further object to provide a novel method for accomplishing various addition reactions that proceed via a free atom and/or free radical chain reaction mechanism. It is a further object to provide a novel method for accomplishing various substitution reactions that proceed via a free atom and/or free radical chain reaction mechanism. Other objects and advantages of the invention will be apparent from the following detailed description thereof.

It has now been discovered that these and other objects may be accomplished by the process of the invention which comprises adding a relatively high molecular weight linear polymer to a liquid medium containing the reactants that are to take part in the desired free atom and/or free radical chain reaction and then applying sheer stress to the resulting liquid mixture, such as by shaking, so as to effect a degradation of the linear polymer.

The above-described process is based upon the discovery that when shear stress is applied to linear relatively high molecular weight polymers, they are degraded to form polymer free radicals, and when this degradation is accomplished in the presence of reactants capable of taking part in free atom and/or free radical reactions the polymer free radicals produced by the degradation initiate free atoms or free radicals of one of the reactants and the chain reaction proceeds as described above.

The polymer to be used in the process of the invention may be any high molecular weight polymer having a linear structure, i. e., a polymer which is free of cross-linking. The polymer may be one that occurs naturally or one that has been produced synthetically. The polymer may be a homopolymer, copolymer or interpolymer. If the polymers are synthetic they may be produced by any suitable method. They may be produced, for example, by addition reactions, condensation reactions, and the like. These reactions may be energized if desired by light and/or heat and may be accomplished in the presence of any type polymerization catalyst, such as peroxides, peracids, persalts, peresters, metals, inorganic salts, Friedel-Crafts type catalyst, and the like. The polymers may be prepared by bulk polymerization, in a solvent solution or in an aqueous emulsion or suspension.

Examples of the polymers that may be used in the process of the invention are cellulose esters and cellulose ethers, such as cellulose acetate, cellulose nitrate, cellulose propionate butyrate, cellulose acetobutyrate, ethyl cellulose, butyl cellulose, and propyl cellulose; linear phenol aldehyde condensation polymers, the vinyl polymers, such as polyvinyl chloride, polystyrene, polymethacrylonitrile, and the like; linear alkyd resins such as the polyesters of glycol and phthalic acid, 1,3-pentanediol and succinic acid, glycol and glutaric acid, and the like; linear polyamides, such as the one obtained by reacting trimethyladipic acid with hexamethylenediamine, linear polymers of ethylene oxide and tetrahydrofuran; linear polysulfide polymers obtained by reacting an organic dihalide with sodium polysulfide; linear polymers obtained by reacting epoxy compounds, such as glycidyl ethers with Friedel-Crafts-type catalysts; polymers of the carbonic acid esters of the unsaturated diols, such as butadiene-3,4 carbonate, polymers of the unsaturated esters of the unsaturated acids, such as diethyl fumarate, diethyl maleate, and the like.

A preferred group of relatively high molecular weight, linear polymers to be used in the process of the invention are the preformed thermoplastic linear homopolymers, copolymers and interpolymers of the polymerizable unsaturated compounds containing at least one non-aromatic carbon to carbon double bond, e. g., an ethylenic linkage, such as the polymers of maleic acid and maleic acid esters, tetrahaloethylene, vinyl-type compounds, etc. Particularly preferred are the polymers of the vinyl-type monomers, i. e., compounds containing at least one $CH_2=C<$ group. Examples of the vinyl-type polymers are the polymers of the butadienes, such as butadiene-1,3,2,3 - dimethyl - 1,3 - butadiene, piperylene, isoprene, chloroprene, the aromatic compounds, such as styrene, alpha-methylstyrene, dichlorostyrene, vinyl naphthalene, vinyl phenol, and the like. Other examples are the polymers of the unsaturated acids, such as acrylic acid and the alpha-alkyl substituted acrylic acids, such as alpha-methyl acrylic acid and alpha-butyl acrylic acid, the polymers of the esters of these unsaturated acids, such as methyl acrylate, methyl methacrylate, butyl methacrylate, and propyl acrylate; the polymers of the vinylidene halides, such as vinylidene chloride and vinylidene bromide; the polymers of the vinyl esters of inorganic acids, such as the halogen acids, and hydrocyanic acid, as vinyl chloride, vinyl bromide, acrylonitrile, and methacrylonitrile; polymers of the vinyl esters of the monocarboxylic acids such as vinyl acetate, vinyl chloroacetate, vinyl benzoate, vinyl laurate, vinyl valerate, and vinyl caproate; the polymers of the vinyl esters of the polycarboxylic acids, such as divinyl succinate, divinyl adipate, vinyl allyl phthalate, vinyl methallyl pimelate, and vinyl methyl glutarate; the polymers of the vinyl esters of the unsaturated acids, such as vinyl acrylate, vinyl crotonate, and vinyl methacrylate; the polymers of the vinyl ethers such as vinyl ethyl ether, vinyl butyl ether, and vinyl allyl ether, and the vinyl ketones, such as vinyl butyl ketone, and vinyl ethyl ketone.

Especially preferred polymers to be used in the process of the invention are the relatively high molecular weight preformed linear polymers of the vinyl-type compounds of the group consisting of the vinylidene halides, acrylic acid and alpha-alkyl substituted acrylic acids wherein the alkyl radical contains from 1 to 4 carbon atoms, the alkyl esters of acrylic acids and alpha-alkyl substituted acrylic acids wherein the alkyl radical in the alcohol portion of the ester radical contains from 1 to 6 carbon atoms and the alkyl radical substituted on the acrylic acid contains from 1 to 4 carbon atoms, the vinyl esters of the saturated monocarboxylic acids containing from 1 to 6 carbon atoms, the vinyl esters of the halogen acids, isobutylene, acrylonitrile, methacrylonitrile, ethacrylonitrile, styrene, and alpha-methylstyrene. Examples of this particularly preferred group of polymers are polyvinylidene chloride, polyvinyl bromide, polyvinyl fluoride, polymethyl methacrylate, polymethacrylonitrile, polyisobutylene, polyacrylic acid, polyethacrylic acid, polyethyl acrylate, polybutyl acrylate, polystyrene, polymethylstyrene, a copolymer of vinyl chloride and vinylidene chloride a copolymer of methacrylonitrile and methyl methacrylate, a copolymer of styrene and vinyl chloride, and a copolymer of vinyl fluoride and ethacrylonitrile.

The molecular weight of the polymers should be sufficiently high to permit a degradation of the polymer molecule when the said polymer is subjected to the agitation treatment. The molecular weight of the polymers used in the process of the invention will, therefore, vary over a considerable range depending upon the ease with which the individual polymer may be degraded, the intensity of the agitation treatment, etc. In some cases polymers having molecular weights as low as or lower than $1 \times 10^4$ may be used in the process. In other cases polymers having a molecular weight as high as or higher than $9 \times 10^6$ may be used. The preferred polymers to be used in the process have molecular weights between $7.5 \times 10^4$ and $7 \times 10^6$. These molecular weights were determined by measuring the intrinsic viscosity of the polymer in solution and calculating the molecular weight as discussed by P. J. Flory in Journal of the American Chemical Society, volume 65, page 372 (1943).

Any type of free atom and/or radical chain reaction may be accomplished by the process of the invention. An example of this type of reaction comprises the reaction between polyhalogenated saturated aliphatic hydrocarbons and ethylenically unsaturated organic compounds. The main reaction between these two types of compounds is illustrated by the above-described equations showing the reaction between carbon tetrabromide and styrene. The polyhalogenated saturated aliphatic hydrocarbons that may be utilized in this type of reaction may be exemplified by carbon tetrabromide, carbon tetrachloride, chloroform, trichloroethane, tetrachloropropane, tetraethylene, and the like, and mixtures thereof. The ethylenically unsaturated organic compounds that may be used in this reaction may be exemplified by octene-1, styrene, ethyl acrylate, biallyl, propylene, ethylene, hexene-1, pentene-1, 1,3-butadiene, methallyl acetate, ethallyl butyrate, allyl caproate, acrylonitrile, methacrylonitrile, dimethallyl phthalate vinyl phenol, acrylic acid, methyl acrylate, allyl chloride, allyl alcohol, vinyl chloride, vinyl laurate, divinyl adipate, and the like, and mixtures thereof. A more detailed description of this type of free radical chain reaction may be found in Journal of the American Chemical Society, volume 69, page 1100 (1947).

Another example of free atom and/or free radical chain reactions that may be accomplished by the process of the invention comprises the reaction between mercaptans and ethylenically unsaturated organic compounds. This type of reaction is illustrated by the following equation showing the reaction between allyl alcohol and ethyl mercaptan:

$$H_2C=CHCH_2OH + C_2H_5SH \rightarrow C_2H_5SCH_2CH_2CH_2OH$$

The mercaptans that may be utilized for this type of reaction may be exemplified by methyl mercaptan, butyl mercaptan, phenyl mercaptan, tertiary butyl mercaptan, octyl mercaptan, isohexyl mercaptan, dodecyl mercaptan, and the like, and mixtures thereof. Ethylenically unsaturated compounds that may be used for this reaction may be exemplified by ethylene, propylene, butene-1, butene-2, 4-methylpentene, styrene, hexadiene-1,4, 3-methylcyclohexene, and the like, mixtures thereof as well as copolymers of the said unsaturated materials. A more detailed description of this type of free radical reaction may be found in U. S. Patent No. 2,392,294.

The process of the invention may also be used to effect the reaction between phosphorous trichloride and various ethylenically unsaturated organic compounds. This type of reaction is illustrated by the following equation showing the reaction between octene-1 and phosphorous trichloride:

$$C_6H_{13}CH=CH_2+PCl_3 \rightarrow C_6H_{13}CHClCH_2PCl_2$$

Examples of ethylenically unsaturated organic compounds that may be used for this type of reaction are styrene, butadiene, ethyl acrylate, butene-2, hexene-1, heptene-1, 4-methylpentene-2, cyclohexene, propylene, butyne, methyl vinyl acetylene, allyl chloride, and the like, mixtures thereof as well as polymers of the said unsaturated compounds. A more detailed description of this type of reaction may be found in Journal of the American Chemical Society, volume 67, page 1864 (1945).

Another example of free atom and/or free radical chain reactions that may be accomplished by the process of the invention comprises the reaction between alkali metal bisulfites and ethylenically unsaturated organic compounds. This type of reaction may be illustrated by the following equation showing the reaction between ethylene and sodium bisulfite:

$$C_6H_5CH=CH_2+NaHSO_3 \rightarrow C_6H_5CH_2CH_2SO_3Na$$

Examples of the ethylenically unsaturated organic compounds that may be used for this type of reaction are ethylene, propylene, isobutylene, styrene, allyl alcohol, cinnamyl alcohol, ethallyl alcohol, ethyl acryloate, hexene-1, heptene-1, cyclohexene, and the like, and mixtures thereof. A more detailed description of this reaction may be found in Journal of Organic Chemistry, volume 3, page 176 (1938).

Another example of free atom and/or free radical chain reactions that may be accomplished by the process of the invention comprises the reaction between halogens or hydrogen halides and ethylenically unsaturated organic compounds. This type of reaction may be illustrated by the following equation showing the reaction between allyl bromide and hydrogen bromide:

$$CH_2=CHCH_2Br+HBr \rightarrow BrCH_2CH_2CH_2Br$$

Examples of the unsaturated organic compounds that may be used for this purpose are ethylene, propylene, isobutylene, styrene, ethyl acrylate, octene-1, butene-2, hexene-1, cyclohexene, allyl chloride, allyl bromide, ethallyl bromide, vinyl chloride, diethyl fumarate, vinyl acetate and the like, and mixtures thereof. A detailed description of this type of reaction may be found on page 181 of "Chemistry of Free Radicals," W. A. Waters, Oxford University Press, 1946.

Substitution type chain reactions that may be accomplished by the process of the invention may be exemplified by the well known halo-substitution reactions. If the compound being treated is an aromatic compound possessing a side-chain the halogenation will usually occur on the said side chain. Examples of compounds that may be halogenated by this type of reaction are toluene, p-chlorotoluene, m-xylene, ethylbenzene, isopropylbenzene, t-butylbenzene, cyclohexane, n-heptane, octene-1, butene-1, n-propylchloride, n-butylchloride, propylene chloride, ethylene chloride, n-propyl bromide, trimethylacetic acid, propionic acid, n-butyric acid, and the like, and mixtures thereof. A more detailed description of this type of free radical chain reaction may be found in an article by Vaughan and Rust in Journal of Organic Chemistry, volume 5, page 449 (1940), and an article in Journal of the American Chemical Society, volume 63, page 2776 (1941).

Another example of substitution type free atom and/or free radical chain reactions that may be accomplished by the process of the invention is the sulfonation reactions accomplished by treating various hydrocarbons with sulfuryl chloride. If the compound being treated is an aromatic compound possessing a side chain the sulfonation will usually occur on the side chain. Examples of compounds that may be sulfonated by this type of reaction comprise toluene, ethylbenzene, n-heptane, tert-butylbenzene, methylcyclohexane, and the like, and mixtures thereof. A more detailed description of this type of reaction may be found in Journal of the American Chemical Society, volume 61, page 3090 (1939).

Still another substitution type chain reaction that may be accomplished by the process of the invention is the carboxylation reaction accomplished by treating various hydrocarbons with oxalyl chloride. Examples of compounds that may be carboxylated in this manner are cyclohexane, methylcyclohexane, toluene, ethylbenzene, n-octane, and the like, and mixtures thereof. This type of reaction is described in detail in Journal of the American Chemical Society, volume 64, page 329 (1942).

The process of the invention may also be used to effect the reaction between carbon disulfide and various hydrocarbons to produce thio-substituted products. Examples of compounds that can be utilized in this reaction are cyclohexane, methylcyclohexane, heptane, butane, octane, toluene, and the like, and mixtures thereof. The description of this type of reaction may be found in Journal of the American Chemical Society, volume 63, page 624 (1941).

Still other types of free radical reactions that may be accomplished by the process of the invention are the oxidation reactions, such as oxidation of alcohols to aldehydes, oxidation of aldehydes to acids, and oxidation of acids to peracids, oxidation of sulfites to sulfates, and oxidation of hydrocarbons to peroxides. A detailed description of these reactions may be found in chapter XI of "Chemistry of Free Radicals," by W. A. Waters, and Trans., Faraday Soc., volume 42, pages 201 to 236 (1946).

The process of the invention may also be used to accomplish addition polymerization reactions, i. e., the formation of macromolecules by the addition of a plurality of molecules of polymerizable ethylenically unsaturated compounds. This may be accomplished by merely adding the aforedescribed high molecular weight linear polymer to a reaction medium containing the desired polymerizable ethylenically unsaturated compound and then subjecting the resulting mixture to an agitation treatment to break up the polymer chains.

The process of the invention may also be used to accomplish "telomerization" reactions. These processes are generally described as reactions, under polymerization conditions, of a molecule YZ, termed a "telogen," with more than one unit of a polymerizable compound having ethylenic unsaturation, termed a "taxogen," to form products called "telomers" having a new carbon to carbon bond and having the formula $Y(A)_nZ$ wherein $(A)_n$ is a divalent radical formed from a plurality of taxogen molecules, the unit A being called a "taxomon," $n$ being an integer greater than 1, and Y and Z, being fragments of the telogen attached terminally to the chain of taxomons. Examples of this type of free radical reaction may be found in U. S. Patent No. 2,348,021, showing the reaction between aliphatic halogen-containing organic compounds, such as tetrachloroethylene, and ethylene, U. S. Patents No. 2,418,832 and No. 2,440,801, showing the reaction between hydrogen chloride and ethylenically unsaturated compounds, and U. S. Patents No. 2,409,683, No. 2,433,015, and No. 2,433,016, showing the reaction between saturated organic compounds containing only carbon, hydrogen, and oxygen, as alcohols, aldehydes, ketones, acids, esters, orthoesters, acid anhydrides, ethers or acetals, with ethylene.

Preferred reactions to be accomplished by the process of the invention are those which yield reaction products of one or more molecules of one or more reactants and only one molecule of a dissimilar reactant, such as, for example, the above-described reactions involving the addition of mercaptans, phosphorus trichloride, alkali metal bisulfites, hydrogen halides and halogens to ethylenically unsaturated compounds, and the above-described substitution reactions, such as the chlorination of cyclohexane, the above-described sulfonation reactions, carboxylation reactions, oxidation reactions and telomerization reactions.

In the operation of the process of the invention the high molecular weight linear polymer is mixed with reactants to be utilized for the above-described free atom and/or free radical chain reactions and shear stress is applied to the resulting mixture as by applying a mechanical agitation treatment so as to effect a degradation of the polymer. A single polymer may be added to the reaction mixture or a mixture of two or more of the polymers may be utilized. The polymer selected need not dissolve in the reactants, but it has been found that better results are obtained if there is at least a partial dissolution of the polymer in said reactants.

The process may be conducted in the presence or absence of solvents. If the reactants are solids, it will be necessary to employ a diluent or solvent to form the liquid reaction mixture. In other cases, diluents and solvents may be desirable in order to effect better contact between the polymer and reactants. If solvents or diluents are employed, however, they should be so selected as to not interfere with the free radical chain reaction that is to take place in the reaction mixture. Examples of solvents and diluents that might be utilized for the process are carbon tetrachloride, cyclohexanone, cyclohexane, methyl ethyl ketone, benzene, toluene, xylene, dibutyl ether, and mixtures thereof.

The amount of the linear polymer to be added to the liquid reaction mixture will vary depending upon the type of polymer selected, amount of reactants taking part in the chain reaction, etc. The linear polymers appear to be more easily broken when their concentration is relatively small so the polymers are employed only in small amounts. In most cases, the amount of linear polymer added will vary from about 0.1% to 10% by weight of the reactants, with a preferred range varying from about 0.5% to 5% by weight of the reactants.

The amount of the reactants to be added to the reaction mixture will vary over a considerable range depending upon the particular type of free atom and/or free radical chain reaction to be conducted and such amounts may be readily determined from the literature or by a few routine determinations. In most cases, the reactants will be utilized in molar ratios varying from 1:5 to 5:1.

In many cases, molecular oxygen will inhibit the desired chain reaction and it is usually desirable to remove the oxygen from the reaction chamber before the degradation is commenced. The removal of oxygen may be accomplished by any suitable method, such as by freezing the mixture and evacuating the reaction chamber by means of a pump, or by passing an inert gas over the mixture so as to clear out the oxygen. Inert gases suitable for this purpose include nitrogen, methane, carbon dioxide, and the like.

The presence of materials which are known to inhibit free radical or free atom chain reactions, such as iodine, sulfur, trinitrotoluene, thionyl chloride, isoamyl nitrite, and the like, should, of course, be avoided. On the other hand, materials, such as catalysts, stabilizers, etc., which will not interfere with the reaction may be introduced at any time into the reaction mixture.

The temperature at which the process of the invention may be carried out may vary considerably. As the reactions are to be initiated by the degradation of the polymer rather than by the use of heat or catalysts, the process is relatively independent of the temperature. In general, temperatures ranging from 0° C. to about 100° C. have proven satisfactory. Preferred temperatures range from about 0° C. to 80° C. Atmospheric, superatmospheric or subatmospheric pressures may be used in the process as desired.

The shear stress may be applied by any suitable means. Mechanical treatments, such as intensive shaking, high speed stirring, milling, kneading, grinding, gear and piston pumps, ultrasonic radiation, passage through filters and capillaries, are satisfactory. The degradation of the preformed polymer is preferably accomplished by passing the reaction mixture through variously designed throttle values, or narrow orifices at high linear velocity. For this purpose an enclosed system and a circulating gear pump or diaphragm pump capable of generating high hydrostatic pressures have proved very satisfactory. Another preferred method comprises subjecting the reaction mixture to high speed stirring, e. g., stirring at the rate of at least 4000 R. P. M.

The amount of shear stress to be applied to the reaction mixture will vary over a considerable range depending upon the type of polymer to be broken, e. g., whether it contains —C—C—, —C—S—, —C—O—, —S—S—, etc., bonds, the molecular weight of the polymer, the viscosity of the solution, etc., but it should be at least sufficient to effect a degradation of the linear polymer. The shear stress applied by the usual slight shaking or stirring of the containers in the laboratory is not sufficient to bring about the desired degradation. In general, the minimum shear stress applied to the solution should be that determined by the following formula $$\frac{2 \times 10^{12}}{(M.W.)^2} = \text{dynes/cm.}^2$$

wherein M. W. is the molecular weight of the linear polymer. Preferably, with polymers having the main chain consisting chiefly of —C—C—, —C—S—, —C—O—, or —S—S— bonds, which polymers are present in amounts varying from 0.5% to 10% by weight of the reactants, the minimum stress should be determined by the formula $$\frac{1 \times 10^{14}}{(M.W.)^2} = \text{dynes/cm.}^2$$

and more preferably $$\frac{2 \times 10^{15}}{(M.W.)^2} = \text{dynes/cm.}^2$$

wherein M. W. is the molecular weight of the linear polymer. Increasing the shear stress increases the formation of polymer free radicals and this in turn increases the rate of reaction, so faster reaction rates may be obtained by using shear stresses which are in considerable excess of those described above.

The products formed in the reaction may be recovered by any suitable means, such as filtration, solvent extraction, dehydration, distillation, and the like.

The process of the invention may be executed in any convenient type apparatus enabling the maintenance of the proper conditions and the introduction of the various reactants. The process may be carried out in batch, semi-continuous or continuous manner. For large scale production it is preferred to conduct the process in a continuous manner.

Preferred chain reactions to be conducted by the process of the invention comprise the reactions between a member of the group consisting of the halogens, hydrogen, the hydrogen halides, polyhalogenated saturated aliphatic hydrocarbons, mercaptans, phosphorous trichloride and the alkali metal bisulfites, and ethylenically unsaturated organic compounds containing at least one $CH_2=C=$ group in their molecule, such as propen-1, butene-1, octene-1, styrene, ethyl acrylate, allyl alcohol, allyl chloride, vinyl chloride, and the like.

A particularly preferred chain reaction to be conducted by the process of the invention comprises the above-described addition reaction between the polyhalogenated saturated aliphatic hydrocarbon and the unsaturated organic compounds. Preferred unsaturated compounds to be utilized in this reaction are those containing a terminal ethylene linkage, i. e., a $CH_2=C<$ group, such as propene-1, butene-1, styrene, ethyl acrylate, allyl alcohol, allyl chloride, vinyl chloride, and the like. The preferred halogenated aliphatic hydrocarbons to be utilized are those saturated open-chain aliphatic hydrocarbons containing from 1 to 4 carbon atoms and containing from 2 to 4 halogen atoms substituted on the chain carbon atoms, such as carbon tetrachloride, carbon tetrabromide, tetrachloroethylene, bromoform, and the like, and mixtures thereof.

Solvents that may be utilized for this preferred type of reaction may be exemplified by carbon tetrachloride, carbon tetrabromide, benzene, toluene, xylene, and mixtures thereof.

The amount of the high molecular weight linear polymer to be utilized in the reaction will preferably vary from 0.5% to 5% by weight of the reactants.

The amount of the polyhalogenated hydrocarbon and the unsaturated organic compound to be utilized will vary over a wide range. In general, the polyhalogenated hydrocarbon will be added in excess, but satisfactory results may be obtained when the unsaturated organic compound is used in excess, or the two reactants are utilized in approximately equal molar amounts. Preferably, the polyhalogenated hydrocarbon and the unsaturated compound are reacted in molar ratios varying from 1:1.5 and 1:5, respectively.

The temperatures to be utilized in this reaction will preferably vary from about 10° C. to 50° C., with a particularly preferred range varying from 20° C. and 40° C. Atmospheric, superatmospheric, or subatmospheric pressures may be utilized as desired.

The halogenated organic compounds produced by the above-described process may be recovered from the reaction mixture by any suitable means, as distillation, extraction, filtration, and the like.

To illustrate the manner in which the invention may be carried out, the following examples are given. It is to be understood, however, that the examples are for the purpose of illustration and the invention is not to be regarded as limited to any of the specific conditions cited therein.

The apparatus used for shaking the reaction mixture consisted of a cylindrical glass vessel (5.08 cm. in diameter and 12.7 cm. in length) joined on one side to a vertical spring-loaded rod that was in sliding contact with a cam eccentrically mounted on the shaft of an electric motor. When the motor was on, the vessel containing the reaction mixture moved back and forth through a distance of 11.5 cm.

The agitation as disclosed in Examples V and VIII was accomplished by passing the reaction mixture to a diaphragm pump and thence forced at a pressure of about 1000 p. s. i. through a unit containing a thin platinum sheet containing a single orifice which varied in diameter from .005 inch to .01 inch.

The stirring reported in the examples was accomplished by means of a Findlay stirrer which consisted of a stainless steel paddle attached to a high speed electric motor.

Parts described below are parts by weight unless otherwise indicated.

*Example I.—Addition of $CBr_4$ to styrene*

About 0.4 part of polystyrene having a molecular weight of $6.33 \times 10^6$ was added to 100 parts of carbon tetrabromide, 7 parts of styrene and 95 parts of carbon tetrachloride and the resulting mixture placed in large ampoules which were deoxygenated and sealed in vacuo. The mixture was then subjected to a shear stress by shaking the ampoule as indicated above at 330 strokes per minute. At the end of 95 hours the ampoules were opened and the mixture distilled to remove carbon tetrachloride and carbon tetrabromide. After sublimation in vacuo to remove the last traces of carbon tetrabromide the residue was distilled in a special low pressure still. The product solidified to form a white product which was identified as 1,1,1,3-tetrabromo-3-phenylpropane (melting point 55–58° C.). The yield was approximately 50% based on the weight of styrene.

*Example II.—Bromination of toluene*

About 0.3 part of polyisobutylene having a molecular weight of $2 \times 10^6$ was added to 20 parts of toluene and .3 part of bromine and the resulting mixture placed in large ampoules which were deoxygenated and sealed in vacuo. The mixture was then subjected to a shear stress by shaking the ampoules at 330 strokes per minute at room temperature in the dark. A similar mixture was prepared and treated in the same manner but was not shaken. At the end of 144 hours the ampoules were opened, the contents added to aqueous potassium iodide, and the liberated iodine titrated with O.1 N thiosulfate. The organic layer was separated off and washed with water. It was then treated with an excess of standardized alcoholic silver nitrate for one hour, after which the excess silver nitrate was determined by the Volhard method. The amount of silver nitrate consumed in the last titration which amounted to 5.50 parts of 0.05 N silver nitrate over that required in the titration of the blank corresponded to the benzyl bromide formed in the reaction.

*Example III.—Oxidation of cumene*

About 16 parts of polyisobutylene having a molecular weight of $2 \times 10^6$ was added to 780 parts of cyclohexane and 860 parts of freshly distilled cumene. The mixture was added to a flask containing a high speed stirrer and oxygen bubbled through the mixture in the dark at 40–50° C. After the mixture had been stirred for 8 hours at moderate speed (100 R. P. M.), no peroxide was detectable in the mixture. The stirrer was then operated at about 9000 R. P. M. for 8 hours and 0.082 part of peroxide was found by an iodometric analysis. An additional 8 hour period of stirring at moderate speed (1000 R. P. M.) at 40–50° C. resulted in no further peroxide formation, indicating that the degradation of polymer at the high stirring speed rather than a thermal reaction was responsible for the peroxide formation. Separation of the polymer from the mixture by precipitation, followed by a determination of peroxide in the polymer free solution showed that at least 90% of the peroxide was not associated with the polymer and was cumene hydroperoxide.

Similar results are obtained by replacing the polyisobutylene in the above-described reaction with 16 parts of each of the following polymers and stirring at the rate of 9000 R. P. M.: polymethyl methacrylate (M. W. $8.7 \times 10^6$) with benzene as solvent, polystyrene having a molecular weight of $6.33 \times 10^6$ and polymethacrylonitrile (M. W. $5.4 \times 10^6$) using methylene chloride as the solvent.

*Example IV.—Chlorination of cyclohexane*

About 1.6 parts of polyisobutylene having a molecular weight of $2 \times 10^6$ was added to 78 parts of cyclohexane and the resulting mixture was placed in a glass ampoule. The mixture was deoxygenated by bubbling with purified nitrogen and then 2.2 parts of chlorine was added. The ampoule was sealed and shaken in the dark at 330 strokes per minute at room temperature (20° C.). A similar mixture was prepared and treated in the same manner but not shaken. At the end of 140 hours the ampoules were opened, added to aqueous sodium iodide, and the liberated iodide titrated with standard thiosulfate. Potassium iodate was then added and the liberated iodine was titrated with thiosulfate to determine the hydrochloric acid concentration. It was found that one-fourth of the chlorine had reacted in the solution which had been shaken whereas only one-tenth of the chlorine had reacted in the unshaken blank.

*Example V.—Addition of mercaptan to styrene*

About 4 parts of polymethyl methacrylate having a molecular weight of $8 \times 10^6$ are added to 90 parts of styrene and 108 parts of phenyl mercaptan and the mixture deoxygenated. The mixture is then subjected to a minimum shear stress of $2.5 \times 10^3$ dynes/cm.$^2$ by passing the liquid through a narrow orifice 0.005 inch in diameter at the rate of 100 grams per minute at 20° C. At the end of 48 hours the mixture is removed and fractionated at reduced pressure. The chief product obtained is 1-phenyl-2-phenylmercaptoethane.

Similar results are obtained by replacing the polymethyl methacrylate in the above process with 4 parts of polybutyl methacrylate having a molecular weight of $5.4 \times 10^6$.

*Example VI.—Addition of CCl$_4$ to octene-1*

About 4 parts of polyisobutylene having a molecular weight of $2 \times 10^6$ are added to 200 parts of carbon tetrachloride and 40 parts of octene-1 in a flask equipped with a high speed stirrer. The mixture is deoxygenated by bubbling with purified nitrogen and then is stirred at 9000 R. P. M. in the dark at 60° C. At the end of about 8 hours the mixture is distilled to remove the excess carbon tetrachloride. Distillation of the residue in vacuo yields 1,1,1,3-tetrachlorononane.

Similar results are obtained by replacing the polyisobutylene in the above process with polyethylene having a molecular weight of about 50,000.

*Example VII.—Addition of CBr$_4$ to styrene*

About 0.5 part of polymethyl methacrylate prepared by photoinitiation (molecular weight of $8.7 \times 10^6$) is added to 100 parts of carbon tetrabromide, 7 parts of styrene and 95 parts of carbon tetrachloride and the resulting mixture placed in large ampoules which were deoxygenated and sealed in vacuo. The ampoules containing the mixture are then shaken at 330 strokes per minute at room temperature in the dark. At the end of 100 hours, the ampoules are opened and the mixture distilled to remove carbon tetrachloride and carbon tetrabromide. After sublimation in vacuo to remove the last traces of carbon tetrabromide, the residue is distilled. The product solidifies to form a white product which is identified as 1,1,3-tetrabromo-3-phenylpropane.

Similar results are obtained by replacing the polymethyl methacrylate in the above-described process with 0.5 part of each of the following polymers: polymethyl acrylate having a molecular weight of $5 \times 10^6$ and polyvinyl chloride having a molecular weight of $4.2 \times 10^5$ (using ethylene dichloride as the solvent).

*Example VIII.—Addition of mercaptan to octene-1*

About 3 parts of polymethacrylonitrile having a molecular weight of $5.4 \times 10^6$ are added to 100 parts of octene-1, 108 parts of phenyl mercaptan and 200 parts of acetone and the mixture deoxygenated. The mixture is repeatedly passed through a narrow orifice 0.005 inch in diameter at the rate of 100 parts per minute at 20° C. At the end of 48 hours the mixture is removed and fractionated at reduced pressure. The chief product obtained is 1-phenylmercapto octane.

Similar results are obtained by replacing the polymethacrylonitrile with equivalent amounts of each of the following polymers: polyisobutylene having a molecular weight of $2 \times 10^6$ (without acetone as a solvent) and a copolymer of vinyl chloride and methacrylonitrile having a molecular weight of $5 \times 10^5$.

*Example IX.—Addition of PCl$_3$ to octene-1*

About 8 parts of a linear copolymer of vinyl chloride and vinyl acetate having a molecular weight of $5 \times 10^5$ are added to 200 parts of cyclohexanone containing 50 parts of octene-1 and 40 parts of PCl$_3$ and the mixture stirred at 9000 R. P. M. The polymer and solvent are then separated to yield $C_6H_{13}CHClCH_2PCl_2$ as the final product.

*Example X.—Addition of mercaptan to styrene*

About 5 parts of an ethylene oxide polymer having a molecular weight of $1 \times 10^5$ are added to 90 parts of styrene and 108 parts of phenyl mercaptan and the mixture deoxygenated. The mixture is then passed through a narrow orifice .005 inch in diameter at the rate of 100 grams per minute at 20° C. At the end of 48 hours, the mixture is removed and fractionated at reduced pressure. The product that is recovered is identified as 1-phenyl-2-phenylmercaptoethane.

Similar results are obtained by replacing the polymer in the above process with a high molecular weight polymer of phenyl glycidyl ether.

*Example XI.—Addition of CCl$_4$ to octene-1*

About 10 parts of ethyl cellulose are added to 200 parts of carbon tetrachloride and 40 parts of octene-1 in a flask equipped with a high speed stirrer. The mixture is deoxygenated by bubbling with purified nitrogen and then stirred at 9000 R. P. M. in the dark at 60° C. At the end of the reaction, the mixture is distilled to remove the excess carbon tetrachloride. Distillation of the residue yields 1,1,1,3-tetrachlorononane.

Similar results are obtained by replacing the ethyl cellulose in the above process with 8 parts of a polysulfide polymer having a molecular weight of about 50,000 and obtained by reacting an organic dihalide with sodium polysulfide.

*Example XII.—Oxidation of cumene*

About 8 parts of a polyester of ethylene glycol and phthalic acid having a molecular weight of about $1 \times 10^4$ are added to 780 parts of cyclohexane and 860 parts of freshly distilled cumene. The mixture is added to a flask containing a high speed stirrer, oxygen bubbled through the mixture in the dark at 50° C. and the mixture stirred at 9000 R. P. M. The polyester is then removed and the peroxide recovered as cumene hydroperoxide.

I claim as my invention:

1. In a process involving a chain reaction which proceeds via the formation of active elements of the group consisting of free atoms and free radicals, the improvement which comprises initiating the chain reaction by means of polymer free radicals formed by subjecting a liquid medium consisting of (1) the reactants to take part in the chain reaction and (2) a high molecular weight linear polymer, to agitation which imparts a shear stress of at least that determined by the formula $$\frac{1 \times 10^{14}}{(M.W.)^2} = \text{shear stress in dynes/cm.}^2$$

wherein M. W. is the molecular weight of the linear polymer.

2. In a process involving a chain reaction of two dissimilar reactants which proceeds via the formation of active elements of the group consisting of free atoms and free radicals, and yields reaction products made up of at least one molecule of one reactant and a single molecule of the other reactant, the improvement which comprises initiating the chain reaction by means of polymer free radicals formed by subjecting a liquid medium consisting of (1) the reactants taking part in the chain reaction, and (2) a minor quantity of a linear polymer having a molecular weight of at least $1 \times 10^4$ to agitation which imparts a shear stress of at least that determined by the formula $$\frac{1 \times 10^{14}}{(M.W.)^2} = \text{shear stress in dynes/cm.}^2$$

wherein M. W. is the molecular weight of the linear polymer.

3. A process as in claim 2 wherein the linear polymer is a member of the group consisting of linear polymers of ethylenically unsaturated monomers, linear polyesters, linear polyamides, linear cellulose ethers and esters, linear polymers of mono-epoxy monomers, and linear polysulfide polymers.

4. A process for producing addition products of an unsaturated organic compound containing a $CH_2=C=$ group and a dissimilar compound of the group consisting of halogens, hydrogen halides, polyhalogenated saturated aliphatic hydrocarbons, mercaptans, phosphorous trichloride, and alkali metal bisulfites, which comprises adding a minor quantity of a linear polymer of an ethylenically unsaturated organic compound, which polymer has a molecular weight of at least $1 \times 10^4$, to a liquid medium consisting of the above-described reactants, and then subjecting the resulting mixture to agitation which imparts a shear stress of at least that determined by the formula $$\frac{1 \times 10^{14}}{(M.W.)^2} = \text{shear stress in dynes/cm.}^2$$

wherein M. W. is the molecular weight of the linear polymer and thereby forming the addition product and recovering the same from the reaction mixture.

5. A process as in claim 4 wherein the linear polymer has a molecular weight between $7.5 \times 10^4$ and $7 \times 10^6$.

6. A process for conducting a free radical chain reaction between two dissimilar reactants which comprises adding a minor quantity of a linear polymer whose main chain consists chiefly of at least one member of the group consisting of —C—C—, —C—S—, —C—O— and —S—S— groupings, and has a molecular weight of at least $1 \times 10^4$, to a liquid reaction mixture consisting of the reactants taking part in the chain reaction, and then in the substantial absence of molecular oxygen, subjecting the resulting mixture to agitation which imparts a shear stress of at least that determined by the formula $$\frac{1 \times 10^{14}}{(M.W.)^2} = \text{shear stress in dynes/cm.}^2$$

wherein M. W. is the molecular weight of the linear polymer and thereby forming a reaction product of the two dissimilar reactants and recovering the same from the reaction mixture.

7. A process for producing halo-alkyl substituted aromatic compound which comprises adding a minor quantity of a linear polymer of an organic compound possessing an ethylenic group, which polymer has a molecular weight of at least $1 \times 10^4$, to a liquid mixture consisting of a halogen and an aromatic hydrocarbon having an aliphatic hydrocarbon radical attached directly to the aromatic nucleus and then in an inert atmosphere, subjecting the resulting mixture to mechanical agitation treatment which is sufficient to furnish a shear stress of at least that determined by the formula $$\frac{1 \times 10^{14}}{(M.W.)^2} = \text{shear stress in dynes/cm.}^2$$

wherein M. W. is the molecular weight of the linear polymer and thereby forming the haloalkyl-substituted aromatic compound.

8. A process for producing an addition product of an unsaturated organic compound containing a $CH_2=C=$ group and an aliphatic mercaptan, which comprises adding a minor quantity of a linear polymer of an organic compound containing at least one ethylenic group, which polymer has a molecular weight of at least $7.5 \times 10^4$, to a liquid reaction mixture consisting of the said unsaturated organic compound and the aliphatic mercaptan, and then in an inert atmosphere shaking the mixture at a rate of at least 330 strokes a minute so as to degrade the linear polymer and form polymer free radicals and thereby forming the addition product and recovering the same from the reaction mixture.

9. A process for preparing 1-phenyl-2-phenyl mercaptoethane which comprises mixing .05% to 5% of a linear polymer of methyl methacrylate having a molecular weight between $7.5 \times 10^4$ and $7 \times 10^6$ with the reactants consisting of styrene and phenyl mercaptan, deoxygenating the resulting mixture and passing the said mixture through narrow orifices so as to expose the mixture to a shear stress of at least that shown by the formula $$\frac{2 \times 10^{15}}{(M.W.)^2} = \text{dynes/cm.}^2$$

wherein M. W. is the molecular weight of the polymer and thereby forming 1-phenyl-2-phenyl mercaptoethane.

10. A process for chlorinating cyclohexane which comprises mixing from .05% to 5% by weight of a polymer of a monomer containing a $CH_2=C<$ group, which polymer has a molecular weight between $7.5 \times 10^4$ and $7 \times 10^6$ with the reactants consisting of cyclohexane and chlorine, and shaking the said mixture in the absence of molecular oxygen so as to apply to the said mixture a shear stress of at least that shown by the formula $$\frac{2 \times 10^{15}}{(M.W.)^2} = \text{dynes/cm.}^2$$

wherein M. W. is the molecular weight of the polymer and thereby forming the chlorinated cyclohexane.

11. A process for preparing benzyl bromide which comprises mixing from .05% to 5% by weight of a polymer of a monomer containing a $CH_2=C<$ group, which polymer has a molecular weight between $7.5 \times 10^4$ and $7 \times 10^6$ with the reactants consisting of toluene and bromide, deoxygenating the resulting mixture, and passing over a distance of 11.5 cm. at the rate of at least 330 strokes a minute so as to degrade the said linear polymer and thereby forming benzyl bromide.

12. A process for preparing cumene hydroperoxide which comprises mixing from .05% to 5% by weight of a linear polymer of isobutylene having a molecular weight between $7.5 \times 10^4$ and $7 \times 10^6$ with the reactants consisting of cumene, bubbling oxygen through the reaction mixture, and stirring the resulting mixture at the rate of at least 9000 revolutions per minute and thereby forming cumene hydroperoxide in the reaction mixture.

13. A process for preparing 1,1,1,3-tetrabromo-3-phenylpropane which comprises mixing from 0.5% to 5% by weight of a linear homopolymer of styrene having a molecular weight between $7.5 \times 10^4$ and $7 \times 10^6$ with the reactants consisting of monomeric styrene and carbon tetrabromide, deoxygenating the resulting mixture, and passing the mixture through a narrow orifice between .01 inch to .005 inch under a pressure of at least 5000 p. s. i. and thereby forming 1,1,1,3-tetrabromo-3-phenylpropane.

14. In a process involving a chain reaction which proceeds via the formation of active elements of the group consisting of free atoms and free radicals, the improvement which comprises initiating the chain reaction by means of polymer free radicals formed by subjecting a liquid medium consisting of (1) the reactants to take part in the chain reaction, (2) an inert solvent, and (3) a high molecular weight linear polymer, to agitation which imparts a shear stress of at least that determined by the formula $$\frac{2 \times 10^{12}}{(M.W.)^2} = \text{shear stress in dynes/cm.}^2$$

wherein M. W. is the molecular weight of the linear polymer, said agitation being unable when applied by itself to a mixture which is the same as that above with the exception that it contains no linear polymer, to initiate the chain reaction.

15. A process for preparing an oxidized hydrocarbon which comprises mixing from .05% to 5% by weight of a linear polymer having a molecular weight between $7.5 \times 10^4$ and $7 \times 10^6$ with a hydrocarbon reactant, bubbling oxygen through the reaction mixture, and subjecting this mixture to agitation which imparts a shear stress of at least that determined by the formula $$\frac{2\times 10^{15}}{(M.W.)^2}=\text{dynes/cm.}^2$$

wherein M. W. is the molecular weight of the linear polymer, and thereby forming an oxidized hydrocarbon, and recovering the same from the reaction mixture.

References Cited in the file of this patent

UNITED STATES PATENTS

| | | |
|---|---|---|
| 2,445,970 | Reinhardt | July 27, 1945 |
| 2,609,395 | Dougherty et al. | Sept. 2, 1952 |

FOREIGN PATENTS

| | | |
|---|---|---|
| 158,294 | Japan | Aug. 16, 1943 |

OTHER REFERENCES

Flosdorf et al.; Jour. Amer. Chem. Soc., vol. 58 (1936), pp. 1069–1076.

Chem. Abstracts, vol. 44 (1950), col. 1126 (1 p.).

Ostroki et al.: Chem Abstracts, vol. 44 (1950), col. 8687–8 (2 pp.).

Weissler: Chem. Eng. Progress Symposium Series, No. 1, vol. 47 (1951), pp. 22–27.

Jellineck et al.: Chem. Abstracts, vol. 45 (1951), col. 6901–2 (2 pp.).